United States Patent [19]

Koomen

[11] Patent Number: 4,573,047
[45] Date of Patent: Feb. 25, 1986

[54] BINARY SELECTOR STAGE AND A SELECTOR AND SELECTOR SYSTEM COMPRISING SUCH SELECTOR STAGES

[75] Inventor: Cornelis J. Koomen, Eindhoven, Netherlands

[73] Assignee: U.S. Philips Corporation, New York, N.Y.

[21] Appl. No.: 461,804

[22] Filed: Jan. 28, 1983

[30] Foreign Application Priority Data

Feb. 16, 1982 [NL] Netherlands .................. 8200580

[51] Int. Cl.[4] .................... H04Q 9/00; H04Q 11/04
[52] U.S. Cl. .................... 340/825.67; 179/18 EA; 340/825.52
[58] Field of Search ............ 340/825.69, 825.52, 340/825.67, 825.02; 179/18 AG, 18 EA, 18 G, 18 ES, 18 AD; 370/91, 60, 54

[56] References Cited

U.S. PATENT DOCUMENTS

| 4,071,702 | 1/1978 | Charransol et al. | 179/18 EA |
| 4,081,612 | 3/1978 | Hafner | 340/825.52 |
| 4,201,891 | 5/1980 | Lawrence et al. | 370/91 |
| 4,442,321 | 4/1984 | Stehman | 179/18 AD |

Primary Examiner—Donald J. Yusko
Attorney, Agent, or Firm—Thomas A. Briody; William J. Streeter; Leroy Eason

[57] ABSTRACT

Contemporary communication networks, telephony exchanges in particular, are frequently provided with a central control. A consequence thereof is that they are very complex. The invention provides a communication network having a high degree of distributed control and processing by providing a binary selector stage from which selectors and selector systems may be assembled to form the entire network. The selector stage comprises an identification circuit (10) for identifying destination addresses applied by its input (12) and which are associated with the service area of the selector stage. An indicator circuit (11) determines from a list-of-free-outputs circuits (32) to which free output the destination address, which is identified by (10) and transferred to a first output (16), must be conveyed. Non-identified destination addresses are transferred to a second output (14), to which output a further selector stage can be connected.

16 Claims, 8 Drawing Figures

BINARY SELECTOR STAGE AND A SELECTOR AND SELECTOR SYSTEM COMPRISING SUCH SELECTOR STAGES

BACKGROUND OF THE INVENTION

The invention relates to a selector stage. The invention also relates to a selector and a selector system comprising a plurality of selector stages.

Such a selector is disclosed in U.S. Pat. No. 638,249. The selector is a step-by-step driven switch which can move in 10 steps in the vertical direction and can rotate also in 10 steps in the horizontal direction and establish a connection between the input and one contact of a contact bank having 10×10 contacts. This selector is usually designated as a two-motion switch. The first auomatic telephone exchanges were equipped with this type of selector and were called Strowger exchanges, after the inventor of the selector. Use of these selectors made it possible at that time to carry on telephone calls without an intermediary operator. The advantage of these exchanges remains the fact that a decentralized structure obtains a relatively high reliability. Disturbances remain limited as much as possible to their immediate environment ("graceful degradation"). A disadvantage is that the control portion is integrated with the speech path portion which resulted in a low degree of flexibility, inter alia as regards the network structure and the control. Further developments show that by adding a register to the selector a first step was made towards centralization of the control: namely, the register is used for a brief period of time (for the period of time needed to establish the connection) and the register can thereafter be employed for one or several other selectors.

Further centralization was accomplished by means of the exchanges commonly referred to as cross-bar system exchanges in which centralized adjustment elements ("markers") are provided which change the dialling information and make it suitable for energizing the cross-bars. In contrast with the Strowger exchanges where the selectors are directly driven by the dialled numbers (direct control), in the cross-bar exchange the dialling information is first taken in by a marker before the selector is set ("indirect control").

A very high degree of centralization was achieved with the exchanges which are commonly referred to as stored program controlled exchanges. Virtually all the control is effected centrally, as a result of which the speech path network and the control form substantially distinct portions. These telephony networks have the drawback that they are very complex which is inter alia reflected by their capacity (number of lines), number of components, number of people involved in their design, design time and the substantially unlimited technical possibilities determined by the programs.

SUMMARY OF THE INVENTION

It is an object of the invention to provide a selector stage, selector and selector system
with which a communication network having a high degree of flexibility and reliability is realized and which is applicable in a large variety of network structures;
with which the design complexity is reduced;
with which a change in, for example, number or place of the terminal or subscriber is processed in a simple way;
and with which an alternative routing is realized in a simple way in the event of congestion, interference on or breakdown of connection paths or nodes.

According to the invention, an embodiment of the selector stage is characterized in that it comprises an identification circuit and an indicator circuit, that the identification circuit has an input to which destination addresses are applied, that the identification circuit comprises means for identifying predetermined destination addresses, that the identification circuit comprises means for transferring identified destination addresses to a first output and that the identification circuit comprises means for transferring indication signals to an indicator output for indicating that a destination address has been identified or not identified and that the indicator circuit has a first input connected to the first output of the identification circuit for applying the identified destination addresses to the indicator circuit, that the indicator circuit comprises means for transferring the identified destination addresses to a first indicator circuit output, that the indication circuit has a second input connected to the indicator output of the identification circuit and that the indicator circuit further comprises means for indicating an address of a free output for the identified destination address and further comprises means for transferring that free output address to a second indicator circuit output.

This selector stage is particular suitable for use as a module for a selector using parallel processing of the applied destination addresses. A selector comprising such selector stages is characterized in accordance with the invention in that the selector comprises $N(N<2)$ parallel selector stage, an input and an output, the input of the identification circuit of each selector stage being connected to the input and to the output of the selector, that the selector further comprises an arbitration circuit having N inputs and N outputs corresponding to those inputs, each of the indicator outputs of the identification circuit being connected to one of the N inputs and each of the second inputs of the indicator circuit being connected to one of the N outputs.

According to the invention, an advantageous embodiment of a selector system comprising such selector stages and selectors is characterized in that the selector system comprises at least a first selector having $N(N \geq 0)$ and a second selector having $M(M \geq 0)$ parallel-arranged selector stages, that the selector system has an input, which input is connected to the input of the identification circuits of all the selector stages, that the selector system comprises an arbitration circuit having inputs and outputs corresponding to those inputs, the indicator outputs of the selector stages each being connected to one of the last-mentioned inputs and the second inputs of the indicator circuits of the selector stages each being connected to one of the last-mentioned outputs, that the selector system further comprises an additional indicator circuit having first and second inputs, the first input being connected to a second output of the last ($M^{th}$) selector stage for transferring non-identified destination addresses and the second input being connected to an additional output of the arbitration circuit and that an additional inverting input of the arbitration circuit is connected to the indicator output of the last ($M^{th}$) selector stage.

It is advantageous if the identification circuit has a second output and comprises means for transferring non-identified destination addresses to the second output.

This selector stage is particularly suitable for use as a module for a selector employing serial processing of the applied destination addresses. In accordance with an embodiment of the invention, a selector comprising such selector stages is characterized in that the selector has an input, an output and N series-arranged consecutive selector stages, each (second) output for non-identified destination addresses of the identification circuit of a selector stage being connected to the input of the identification circuit of the subsequent selector stage, that the input of the first identification circuit is connected to the input of the selector and that the (second) output for non-identified destination addresses of the identification circuit of the last selector stage is connected to the selector output.

According to the invention, an advantageous embodiment of a selector system comprising such selector stages and selectors is characterized in that the selector system comprises at least a first selector having $N(N \geq 0)$ and a second selector having $M(M \geq 0)$ series-arranged, consecutive selector stages, wherein for each selector each (second) output for non-identified destination addresses of the indentification circuit of a selector stage being connected to the input of the identification circuit of the subsequent selector stage, the input of the first identification circuit of the first selector being the input of the selector system, that the (second) output for non-identified destination addresses of the identification circuit of the last ($N^{th}$) selector stage of the first selector is the output of the first selector, which output is connected to the input of the identification circuit of the first selector stage of the second selector, that the output for non-identified destination addresses of the identification circuit of the last ($M^{th}$) selector stage of the second selector is the output of the second selector, that the selector system comprises an additional indicator circuit, that the output of the second selector is connected to a first input of the additional indicator circuit and that a second inverting input of the additional indicator circuit is connected to the indicator output of the last identification circuit of the second selector.

By using the high degree of distributed control and processing obtained in this manner, a comparatively simple, flexible and reliable communication network is realised. Such communication networks are particularly suitable for use in public and domestic and company telephony systems as well as in telex networks and interface networks between computers.

BRIEF DESCRIPTION OF THE DRAWINGS

Embodiments of the invention and its advantages will now be further described by way of example with reference to the accompanying Figures, the same reference symbols being used for corresponding elements. Herein:

FIG. 1b is a schematic representation of FIG. 1a;

DESCRIPTION OF THE PREFERRED EMBODIMENTS

Figure 1A:
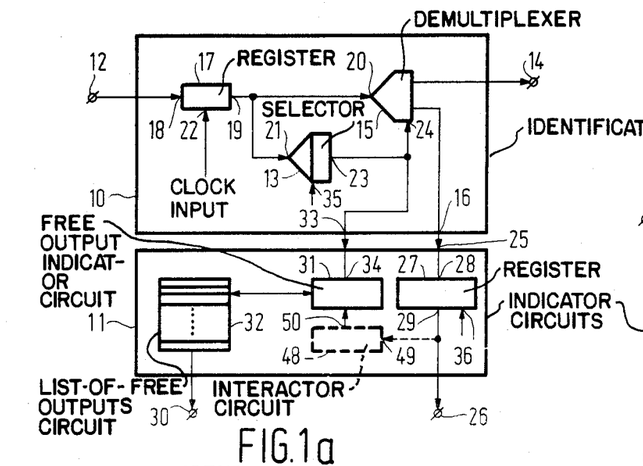
FIG. 1a shows a selector stage in accordance with the invention.

The selector stage shown in FIG. 1a is formed by an identification circuit 10 and an indicator circuit 11. The identification circuit 10 has an input 12 to which destination addresses are applied. The identification circuit 10 comprises means for identifying predetermined addresses, which means are predominantly formed by a selector 13. Destination addresses may be the subscriber or terminal number of a person called, possibly completed by the subscriber's exchange code and country number. The identification circuit 10 further comprises means for transferring non-identified destination addresses to a second output 14 of the identification circuit 10, which means are predominantly formed by a demultiplexer 15. The identification circuit further comprises means for transferring the identified destination addresses to a first output 16, which means also comprise inter alia the demultiplexer 15. In addition, the identification circuit 10 comprises a register 17 having an input 18 connected to the input 12, an output 19 connected to an input 20 of the demultiplexer 15 and to an input 21 of selector 13, and a clock input 22 to which timing signals are applied for writing and reading the destination addresses. The identification circuit 10 operates as follows. A destination address, further designated by d, which is applied to input 12 is placed in the register 17 and thereafter applied to selector 13 and to demultiplexer 15. Selector 13 is, for example, in the form of a memory (for example a RAM memory) which stores those destination addresses which can be identified and those which cannot be identified. If selector 13 identifies the applied destination address as being the same as a destination address stored in the memory, then a logic signal, for example the value "1", is applied to an output 23 of the selector. In the other case a logic signal having the value "0" is applied. The output 23 of selector 13 is connected to a control input 24 of demultiplexer 15 for conveying, in dependence on the logic value supplied by selector 13, the destination address d to the second output 14 or to the first output 16. The list of destination addresses to be identified, stored in selector 13 defines as it were the service area of the selector stage: destination addresses (or destinations) not belonging to the service area are passed on without further processing, while destination addresses which do belong to the service area are absorbed, that is to say they are applied to the indicator circuit for further processing.

The indicator circuit 11 has a first input 25 which is connected to the first output 16 of the identification circuit 10 for supplying the identified destination addresses thereto. In addition, the indicator circuit 11 comprises means for transferring the identified destination addresses to a first indicator output 26, which means are predominantly formed, in a preferred embodiment, by a register 27, an input 28 of which is connected to the first input 25 and an output 29 to the first indicator circuit output. Timing signals are applied to a clock input 36 for writing and reading destination addresses at the correct instant. The indicator circuit 11 further comprises means for indicating an address of a free output for the benefit of the identified destination address, and transferring that address to a second indicator circuit output 30. These means predominantly comprise a free-output-indicator 31 and a list-of-free-outputs-circuits 32, for example in the form of a memory. The free-output-indicator 31 indicates to which free output the destination address d is to be sent and, after occupation of a free output, informs the list-of-free-outputs-circuit 32 that the relevant output must be deleted from this list. Also an indication is given that an output which has been occupied so far has become free.

The indicator circuit 11 operates as follows. If a destination address is applied to input 25 and is thereafter stored in register 27, the free-output-indicator 31 is activated. This can be effected in several manners. In the embodiment shown in FIG. 1, the identification circuit 10 has an indicator output 33 which is connected to the output 23 of selector 13. Upon identification of the destination address the logic signal produced by selector 13 is then also transferred to this indicator output 33. As an input 34 of free-output indicator 31 is connected to indicator output 33 the latter is activated upon a successfull identification by selector 13. A different-not-shown-manner of activating indicator circuit 31 is to detect whether a destination address is applied to input 25 and, if so, to apply a signal to input 34 indicating that this signal is to be conveyed. The connection shown between the output 23 of the selector 13 and input 34 of free-output-indicator 31 may then be omitted. Whichever manner of activation is chosen, both manners result in there being applied to a second indicator circuit output 30 the address of the free output to which the destination address d applied to the first indicator circuit output 26 is to be conveyed. In the further course of the description it will be assumed that the above-mentioned first manner of activation is adopted.

It should further be noted that register 27 is not strictly indispensable: if selector 13 has notified the indicator circuit 11 that a destination address belongs to the service area, then after an address of a free output has been determined, the destination address can be conveyed directly from register 17 (via demultiplexer 15) to the first indicator circuit output 26.

If no free output is available, it is possible to react thereto in different manners. In the case just described, namely the case when register 27 is absent, the destination address d can be transferred from register 17 to the second output 14 of the identification circuit 10 by free-output-indicator 31, for example by means of a suitable signal at input 24 of the multiplexer 15. When a register 27 is present and if the destination address is already stored therein, the destination address in register 27 can be transferred to the second output 14 of said identification circuit 10 by free-output-indicator 31 via means, not shown.

The function of the selector stage thus obtained is easily programmable and modifiable. The service area of the selector layer is determined by the content of the memory of selector 13. When necessary the content of the memory can be modified by an input 35 of the selector 13, denoted the SER-input (Set, Erase, Read) hereinafter. Modifying the location of the subscriber (or the terminal) can consequently be implemented in a simple manner.

Figure 1B:
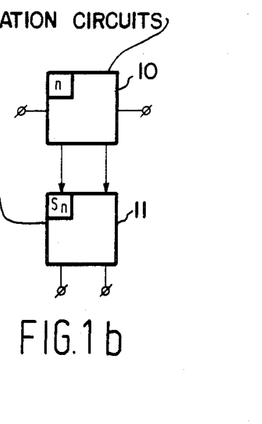
Figure 2:
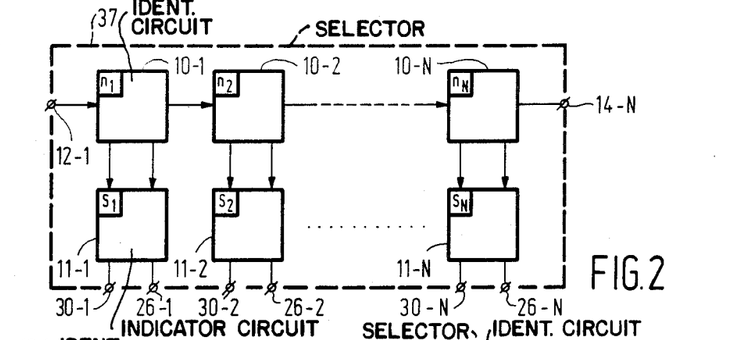
FIG. 2 shows a first embodiment of a selector comprising selector stages as shown in FIG. 1.

The selector stages shown in FIG. 1 can be arranged in series to obtain a selector 37 of the type shown in FIG. 2. The input 12-1 of the first selector stage 10-1, 11-1 is then at the same time the input of the selector, the second output 14 of each selector stage is connected to the input of the next selector stage while the last output 14-N, of the $N^{th}$ selector stage 10-N, 11-N is at the same time the output of the selector. This selector has N first indicator circuit outputs 26-1, 26-2, . . . 26-N and N second indicator circuit outputs 30-1, 30-2, . . . 30-N. The value of N can be chosen at will ($N \geq 2$). In the Strowger two-motion switches N is equal to ten.

Figure 3:
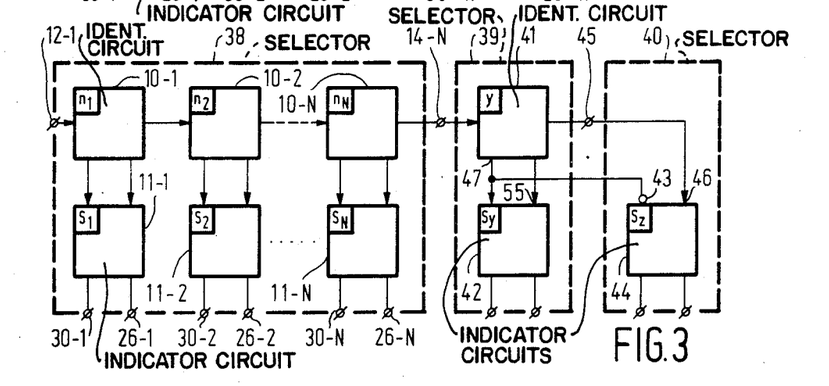
FIG. 3 shows a first embodiment of a switching system comprising selectors as shown in FIG. 2 and selector stages as shown in FIG. 1 in accordance with the invention.

Networks having a mixed hierarchical/non-hierarcical structure, such as, for example, telephony networks, know in principle three orientations, namely "up", "down" and "horizontal". A selector system based on that principle is shown in FIG. 3. The selector system comprises three selectors 38, 39 and 40. In the first selector 38 (of the same type as selector 37 in FIG. 2) it is checked in the consecutive selector stages 10-1, 11-1; 10-N, 11-N whether the destination address d is located in the service area of the relevant stage. The service area of selector 38 in its totality comprises all (hierarchically lower destinations which are (orientation: "down"). If the destination address d does not belong to the service area of selector 38, then the destination address is transferred to selector 39 via output 14-N. (As mentioned in the foregoing, in the event that there is no free output available in selector 38 for the applied destination address, output 14-N may also be utilized to transfer these destination addresses to selector 39). Selector 39 may be formed by one selector stage 41, 42 (as shown in the Figure) or a plurality of (M) selector stages which have the same structure as the selector stage shown in FIG. 1. In selector 39 it is checked whether the applied destination address d can be reached via a different node in the same network layer (orientation: "horizontal"). If this is not the case, then the destination address is transferred to a third selector 40. This selector comprises only one indicator circuit 44 having a structure comparable with that of the indicator circuit shown in FIG. 1. The first output 45 of the selector 39 is connected to a first indicator circuit input 46 and an inverting input 43 is connected to the indicator output 47 of the identification circuit 41. If the destination address d does not belong to the service area of selector 39, the destination address is applied to an input 46 of the indicator circuit 44 of the third selector 40, while activation of the free-output-indicator (not shown) of indicator circuit 44 is effected by applying thereto the inverted version of the signal received from the selector (not shown) of identification circuit 41.

In the preceding it is assumed that the selector 38 (orientation "down") and the selector 39 (orientation "horizontal") comprise at least one selector stage. It is, however, perfectly conceivable that in a communication network situations may occur where one or two of the selectors in a node will be sufficient. The following situations are the most important situations which may occur.

a. $N=0$, $M \geq 1$. The selector 38 does not comprise a selector stage at all and is therefore wholly absent. This means that for the destination addresses applied to the input (so in this case 14-N) of the selector system a search is made by the selector 39 and 40, respectively for a free output (to a subsequent node) in hierarchically the same or in a higher network layer.

b. N≧1, M=0. The selector 39 does not comprise a selector stage at all and is consequently wholly absent. This means that for destination addresses applied to the input (12-1) of the selector system a free output to a subsequent node is searched in a hierarchically lower or higher network layer. From the node in the network layer in which the selector system is located no other node is (directly) accessible in that same network layer.

c. N=0, M=0. The selector system only comprises the third selector 40, which comprises only indicator circuit 44. Destination addresses which are transferred to a selected free-output (orientation: "up") are applied to the input of the selector system (in this case input 46 of the indicator circuit 44). All applied destination addresses are transferred to a node in a higher network layer.

A further situation which may occur is that the third selector (40 in FIG. 3) is absent. This means that the orientation "up" is absent which may, for example, occur for nodes in the hierarchically highest network layer. This is also conceivable for other situations: in a not completely meshed network it may happen that the desired node, located in a higher network layer, is not directly accessible from the actual node but is so via a different node which is located in the same network layer as the actual node. The selector system in the last mentioned node then only comprises the selectors 38 and 39 (FIG. 3). If now the destination address applied to identification circuit 41 of the selector 39 is not located in the service area of this selector then this destination address is transferred to output 45. Since selector 40 is absent, a connection between output 45 and the first input 55 of the indicator circuit 42 is provided for that case. Activation of free-output-indicator (not shown) or indicator circuit 42 is also provided. Thus, the destination address is then transmitted to a free output of a node in the same network layer. In that node it is then investigated whether an output to the desired node in a higher network layer is accessible.

The selector system offers the possibility to realize very diverse network structures (loop, tree, mixed tree/loop structure etc.). In addition, an alternative routing can be achieved in a simple manner by means of the selector system in those cases where some links are eliminated due to congestion or interference. The flexibility can be still further increased by adding to one, several or all the selector stages of a selector an interactor circuit 48 (FIG. 1) An input 49 thereof is connected to output 29 of register 27 and an output 50 is coupled to free-output-indicator 31. In dependence on the destination address d stored in register 27 the free-output-indicator 31 can be controlled by interactor 48, as a result of which a sudden change in the routing can, for example, be realized.

Figure 4:
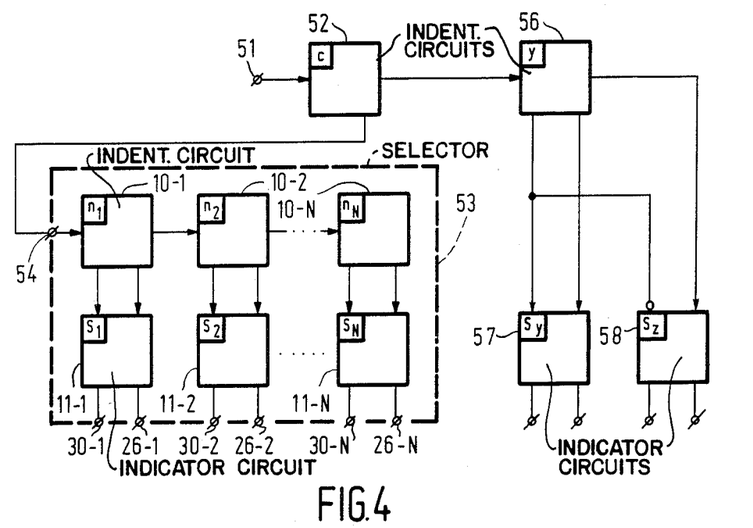
FIG. 4 shows a second embodiment of a switching system comprising selectors and selector stages as shown in FIG. 1 and FIG. 2 in accordance with the invention.

The selector system shown in FIG. 3 is based on serial processing of the destination addresses. Serial processing may, however, also be effected at several levels, as shown in the selector system of FIG. 4. An input 51 of the selector system is connected to an input of the identification circuit 52. If the destination address d belongs to the service area then the destination address is conveyed to an input 54 of a selector 53, which comprises N selector stages, which selects in the manner described above with reference to FIG. 2 a free output to which the destination address can be conveyed. If the destination address does not belong to the service area of identification circuit 52 then it is conveyed to a subsequent identification circuit 56. Also if, for example, no free output can be found by selector 53 the destination address can be conveyed to the subsequent identification circuit 56. If the destination address d belongs to its service area, the identification circuit 56 can convey this address to a further selector (not shown) to find the relevant free output. The structure is then comparable with the structure of identification circuit 52 and selector 53. If one selector stage is sufficient, as shown in FIG. 4, then the destination address is applied to indicator circuit 57, if it belongs to the service area of identification circuit 56 or, if this is not the case, to indicator circuit 58. In this manner a preselection is made at a higher abstraction level (identification circuit 52), while the actual selection is made on a lower level (selector 53). It is obvious that it is alternatively possible to utilize more than two levels.

Figure 5:
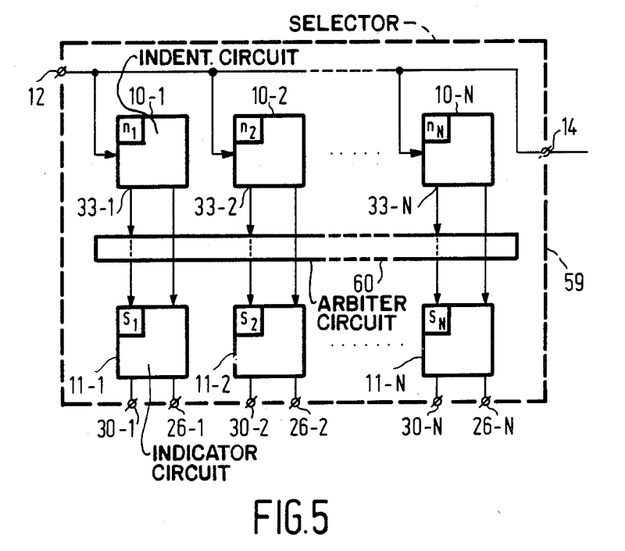
FIG. 5 shows a second embodiment of a selector comprising selector stages as shown in FIG. 1.

Selector stages as shown in FIG. 1 may alternatively be arranged in parallel to obtain a selector 59 as shown in FIG. 5. The inputs of the N selector stages (N≧2) 10-1, 1:-2, . . . 10-N are all connected to an input 12 of the selector and to an output 14 of the selector. The outputs 33-1, 33-2, . . . 33-N of the identification circuits are all coupled to the corresponding second inputs (inputs of the free output indicator circuits) of the indicator circuits 11-1, 11-2, . . . N via an arbiter circuit 60. The arbiter circuit 60 has for its object to ensure that only one of the free-output-indicator inputs is activated. It is advantageous to choose for this purpose the leftmost of the outputs 33 of those identification circuits which have the destination address located in their service areas. This accomplishes that the destination address is found at the lowest level. Such an arbiter circuit is known per se from the literature (based on, for example, the principle commonly referred to as the daisy chain principle).

Figure 6:
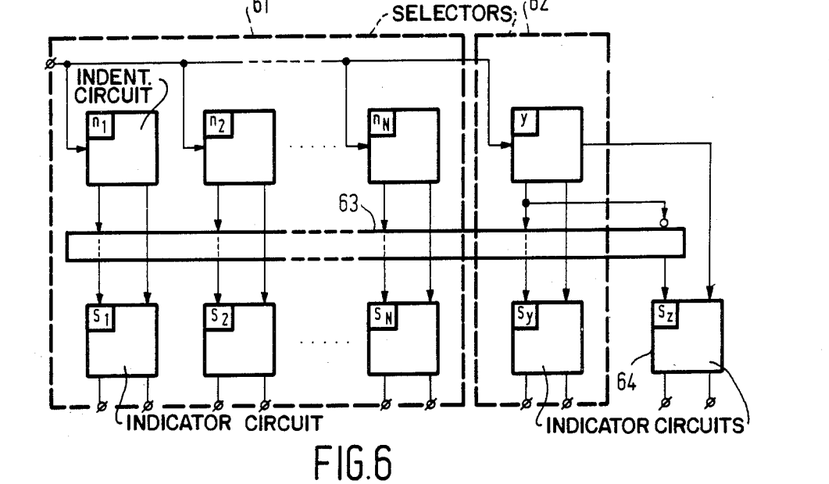
FIG. 6 shows a first embodiment of switching system comprising selectors in accordance with the second embodiment (FIG. 5) and selector stages as shown in FIG. 1 in accordance with the invention.

A first embodiment of a selector system with parallel processing is shown in FIG. 6. The selector system comprises a first selector 61 incorporating N(N≧0) parallel-arranged selector stages n1-S1, . . . nN-SN, and a second selector 62 incorporating M(M≧0) parallel-arranged selector stages (the following description describing the structure for the case that N≧1. The case N=0 corresponds to the case N=0 already described in the foregoing with reference to the selector system shown in FIG. 3). For the sake of simplicity, in the figure M=1 is chosen and consequently only the last (and only) selector stage is shown. (The case M=0 corresponds to the case where M=0 described with reference to FIG. 3). Selectors 61 and 62 further comprise an arbiter circuit 63. In all other respects the operation of the selectors 61 and 62 is the same as the operation of the selector shown in FIG. 5. In addition, the selector system comprises a third selector formed by an additional indicator circuit 64. A first input of indicator circuit 64 is connected to the second output of the last ($M^{th}$) identification circuit of selector 62. A second input of the additional indicator circuit 64 is connected to an additional output of the arbiter circuit 63. The inverting input of arbiter circuit 63, which corresponds to this additional output, is connected to the indicator output of the last identification circuit of selector 62. If a destination address is not identified by the last selector stage of the second selector 62 then the destination address is transferred to the additional indicator circuit 64. The indicator signal of the last identification circuit of the second selector 62, indicating that no identification has taken place, is transferred to the second input of the additional indicator circuit 64. This transfer is a positive identification signal because of the inverting action of the additional input of the arbiter circuit.

The first embodiment of a selector system with parallel processing as shown in FIG. 6 may be considered as the counterpart of the first embodiment of the selector system with serial processing as shown in FIG. 3.

Figure 7:
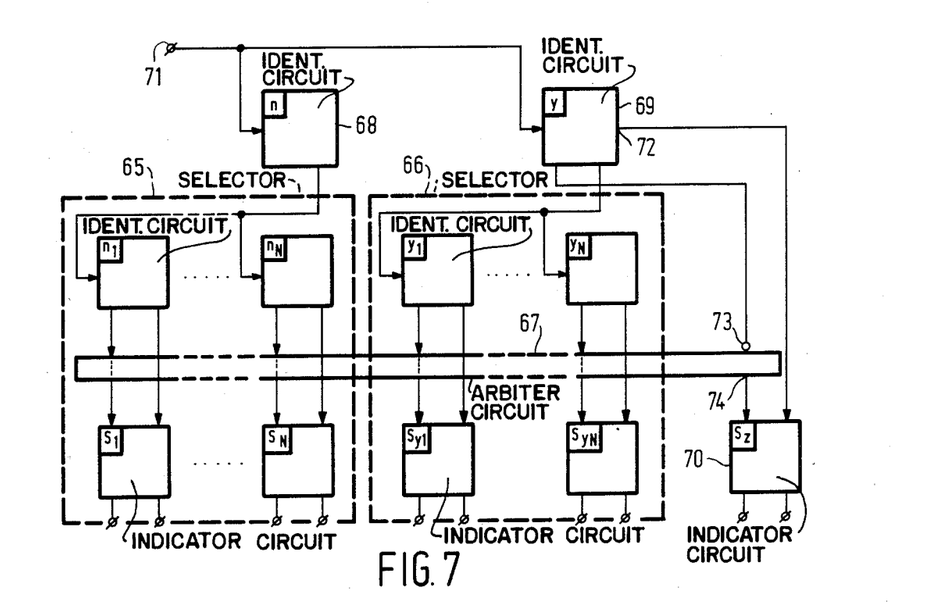
FIG. 7 shows a second embodiment of a switching system comprising selectors in accordance with the second embodiment (FIG. 5) and selector stages as shown in FIG. 1 in accordance with the invention.

FIG. 7 shows a second embodiment of a selector system with parallel processing. This embodiment may be considered as the counterpart of the second embodiment of the selector system with serial processing as shown in FIG. 4. The selector system comprises a first selector 65 having N parallel-arranged selector stages ($N \geq 0$) and a second selector 66 having $M(M \geq 0)$ parallel-arranged selector stages (In the description let it be assumed that $N \geq 1$ and $M \geq 1$. The case $N=0$ and/or $M=0$ has already been described in the foregoing with reference to the selector system shown in FIG. 3) The selector system further comprises an arbiter circuit 67 having inputs and outputs for connecting the identification and indicator circuits of the selector stages of the first selector 65 and the second selector 66 in the manner described with reference to FIG. 5. In addition, the selector system comprises a first and a second additional identification circuit 68 and 69, respectively and a third selector formed by an additional indicator circuit 70. An input of the additional identification circuits 68 and 69 is connected to an input 71 of the selector system. A first output of the additional identification circuit 68 is connected to an input of each of the identification circuits of the first selector 65 and a first output of the additional identification circuit 69 is connected to an input of each of the identification circuits of the second selector 66. The second additional identification circuit 69 further comprises means for conveying the destination address to a second output 72 in the event the applied destination address is not identified. Second output 72 is connected to a first input of the additional indication circuit 70. An indicator output of the additional identification circuit 69 is connected to a further, inverting input 73 of the arbiter circuit 67. The output 74 of arbiter circuit 67 corresponding to the input 73 is connected to a second input of the additional indicator circuit 70.

In a communication network, a distinction can be made between a control network and a data network. In the control network connections are, for example, made and broken while the actual communication, the transmission of data, is effected in the data network. Selector stages, selectors and selector systems form part of the control network. They are used to build up from selector to selector a path from caller to the person called. In the conventional Stowger exchanges with in-band signalling (the signalling channel is located in the frequency band utilized for speech) the control network physically coincides for the major part with the data network. The path from caller to the person called, effected in the signalling phase, is thereafter utilized as the speech path connection (through with an adapted frequency band). This is also possible with a communication network comprising the selector stage, selectors and selector systems in accordance with the invention. The path which is established in a node from the input to the free output serves in the information phase as a portion of the data connection (so in exchanges as a portion of the speech path connection).

It is likewise possible to form the control network and the data network such that they are strictly separated. A connection in the data network then corresponds to a path or a portion of the path, as the case may be in the control network. For telephony exchanges this means that the speech path network is a network which is physically different from the control/signalling network. The switching system in the speech path network (generally the information network) may have a structure in accordance with one of the known types:

with a switching system with space-division multiplex the coordinate switch(es) determined by the address of the free output (for example by decoding the address) is the speech path network is (are) closed; with a switching system with time-division multiplex a speech path is made available cyclically during a short period of time under the control of a connection memory which stores the data for opening and closing in the proper manner (at the proper instant) the desired connection ports, which information is determined from the address of the free output; with a switching system with frequency-division multiplex a speech signal is established by making available a specific frequency band which is determined by the address of the free output.

What is claimed is:

1. A selector stage comprising an identification circuit and an indicator circuit, said identification circuit including an input to which signals having respective destination addresses are applied, and storage means storing a plurality of destination addresses and means for identifying individually each of a plurality of applied predetermined destination addresses by comparison with said plurality of addresses pre-stored within said identification circuit and means for transferring identified destination addresses which have been applied to said indentification circuit to a first output and means for transferring indication signals to an indicator output of said identification circuit for indicating in response to said comparison whether a destination address has been identified or not identified;

said indicator circuit including a first input connected to said first output of said identification circuit for applying the individually identified destination addresses to the indicator circuit, and further including means for transferring said individually identified destination address to a first indicator circuit output, and a second input connected to the indicator output of the identification circuit, and means responsive to the signal at said second input for indicating an address of a free output for the identified destination address, and means for transferring said free output address to a second indicator circuit output.

2. A selector stage as claimed in claim 1, wherein said identification circuit has a second output, the identification circuit further including means responsive to said comparison for transferring non-identified destination addresses to the second output.

3. A selector stage as claimed in claim 2, the indicator circuit further including an interactor circuit for sensing the identified address and for directing the choice of an address of a free output, said choice depending on the identified destination address.

4. A selector comprising selector stages as claimed in claim 2 or 3, said selector having an input, an output and $N$ ($N \geq 2$) series-arranged, consecutive selector stages, each second output for nonidentified destination addresses of the identification circuit of a selector stage being connected to the input of the identification circuit of the subsequent selector stage, the input of the first identification circuit being connected to the input of the selector and the second ouput for non-identified destination addresses of the identification circuit of the last selector stage being connected to the output of the selector.

5. A selector system comprising selector stages as claimed in claim 2 or 3, the selector system including at least a first selector having $N(N \geq 0)$ and a second selector having $M(M \geq 0)$ series-arranged consecutive selector stages, for each selector each second output for non-identified destination addresses of the identification circuit of a selector stage being connected to the input of the identification circuit of the subsequent selector stage, the input of the first identification circuit of the first selector being the input of the selector system, the second output for non-identified destination addresses of the identification circuit of the last ($N^{th}$) selector stage of the first selector being the output of the first selector, said output of the first selector being connected to the input of the identification circuit of the first selector stage of the second selector, the output for non-identified destination addresses of the identification circuit of the last ($M^{th}$) selector stage of the second selector being the output of the second selector, the selector system further including an additional indicator circuit, the output of the second selector being connected to a first input of the additional indicator circuit and a second, inverting input of the additional indicator circuit being connected to the indicator output of the last identification circuit of the second selector.

6. A selector system comprising selector stages as claimed in claim 2 or 3, the selector system includng at least a first selector having $N(N \geq 0)$ and a second selector having $M(M \geq 0)$ series-arranged consecutive selector stages, for each selector each second output for non-identified destination addresses of the identification circuit of a selector stage being connected to the input of the identification circuit of the subsequent selector stage, the input to the first identification circuit of the first selector being the input of that selector, the second output of the last ($N^{th}$) identification circuit of the first selector being the output of that selector, the input of the first identification circuit of the second selector being the input of that selector, the second output of the last ($M^{th}$) identification circuit of the second selector being the output of that selector, the selector system further including first and second additional identification circuits and an additional indicator circuit, the first additional identification circuit having an input for destination addresses, said input for destination addresses being the input of the selector system, the first additional identification circuit having a first and a second output, the first output being connected to the input of the first selector, the second additional identification circuit having an input and a first and a second output, the input being connected to the second output of the first additional identification circuit, the first output of the second additional identification circuit being connected to the input of the second selector, the additional indicator circuit having a first input and a second inverting input, the first input being connected to the second output of the second additional identification circuit and the second inverting input of the additional indicator circuit being connected to the indicator output of the second additional identification circuit.

7. A selector comprising selector stages as claimed in claim 1 or 3, said selector including $N(N \geq 2)$ parallel selector stages, an input and an output, the input of the identification circuit of each selector stage being connected to the input and to the output of the selector, said selector further including an arbiter circuit having N inputs and N outputs corresponding to said N inputs, each of the indicator outputs of the identification circuit being connected to one of the N-inputs and each of the second inputs of the indicator circuit being connected to one of the N-outputs, said arbiter circuit selecting only a single indicator circuit to receive the indicator output signal of one identification circuit when more than one of said parallel connected identification circuits identifies the same destination address.

8. A selector system comprising selector stages as claimed in claim 1 or 2, said selector system including at least a first selector having $N(N \geq 0)$ and a second selector having $M(M \geq 0)$ parallel-arranged selector stages, the selector system having an input connected to the input of the identification circuits of all selector stages, the selector system further including an arbiter circuit having inputs, the indicator outputs of the selector stages being connected to said inputs and outputs corresponding to those inputs, the second inputs of the indicator circuits of the selector stages being connected to said outputs, the selector system further including an additional indicator circuit having first and second inputs, the first input being connected to a second output of the last ($M^{th}$) selector stage for transferring non-identified destination addresses and the second input being connected to an additional output of the arbiter circuit, and an additional, inverting input of the arbiter circuit being connected to the indicator output of the last ($M^{th}$) selector stage, said arbiter circuit selecting only a single indicator circuit to receive the indicator output signal of one identification circuit when more than one of said parallel connected identification circuits identifies the same destination address.

9. A selector system comprising selector stages as claimed in claim 1 or 2, said selector system including at least a first selector having $N(N \geq 0)$ and a second selector having $M(M \geq 0)$ parallel-arranged selector stages, the first selector having an input to which the inputs of the identification circuits of all the selector stages of the first selector are connected, the second selector having an input to which the inputs of the identification circuit of all the selector stages of the second selector are connected, the selector system further including an arbiter circuit having inputs to which the indicator outputs of the identification circuit of the selectors are connected and outputs corresponding to those inputs, to which outputs the second inputs of the indicator circuits of the selectors are connected, the selector system further including first and second additional identification circuits and an additional indicator circuit, an input of the first and second additional identification circuits each being connected to an input of the selector system, a first output of the first additional identification circuit being connected to the input of the first selector and a first output of the second additional identification circuit being connected to the input of the second selector, the first input of the additional indicator circuit being connected to the second output of the second additional identification circuit for transferring non-identified destination addresses and the second input of the additional indicator circuit being connected to an additional output of the arbiter circuit, and an additional, inverting input of the arbiter circuit being connected to the indicator output of the second additional identification circuit, said arbiter circuit selecting only a single indicator circuit to receive the indicator output signal of one identification circuit when more than one of said parallel connected identification circuits identifies the same destination address.

10. A selector stage comprising:
identification circuit means having signals input thereto, said input signals having respective destination addresses, said identification circuit including:
storage means pre-storing a plurality of destination addresses;
means for identifying individually each of a plurality of input destination addresses by comparison with said plurality of addresses pre-stored within said storage means circuit; said means for identifying generating indication signals for indicating in response to said comparison whether a destination address has been identified or not identified; and
a first output and means responsive to said comparison for transferring identified destination addresses to said first output;
indicator circuit means having means responsive to said indication signals for indicating an address of a free output for application there to of an identified destination address, and means for outputting said free output address.

11. A selector stage as claimed in claim 10, wherein said identification circuit means includes a second output and means responsive to said comparison for transferring non-identified destination addresses to said second output.

12. A selector stage as claimed in claim 11, and further comprising an interactor circuit for sensing the identified address and for directing the choice of an address of a free output, said choice depending on the identified destination address.

13. A selector comprising selector stages as claimed in claim 11 or 12, said selector having $N(N \geq 2)$ series-arranged, consecutive selector stages, each second output for non-identified destination addresses being connected to the input of the identification circuit means of the subsequent selector stage.

14. A selector system comprising selector stages as claimed in claim 11 or 12, the selector system including at least a first selector having $N(N \geq 0)$ and a second selector having $M(M \geq 0)$ series arranged consecutive selector stages, for each selector each second output for non-identified destination addresses of a selector stage being input to the identification circuit means of the subsequent selector stage, the second output for non-identified destination addresses of the last ($N^{th}$) selector stage of the first selector being input to the identification circuit means of the first selector stage of the second selector, the selector system further including an additional indicator circuit means, the second output of the last ($M^{th}$) selector stage of the second selector being connected to a first input of said additional indicator circuit and a second, inverting input of said additional indicator circuit receiving the indicator signals of the last identification circuit means of the second selector.

15. A selector system comprising selector stages as claimed in claim 11 or 12, the selector system including at least a first selector having $N(N \geq 0)$ and a second selector having $M(M \geq 0)$ series-arranged consecutive selector stages, for each selector each second output for non-identified destination addresses of a selector stage being input to the identification circuit means of the subsequent selector stage, the second output of the last ($N^{th}$) selector stage of the first selector being input to the first identification circuit of the second selector, the second output of the last ($M^{th}$) identification circuit of the second selector being the output of that selector, the selector system further including first and second additional identification circuit means and an additional indicator circuit means, said first additional identification circuit means having a first and a second output, the first output being connected to the input of the first selector, the second additional identification circuit means having an input connected to the second output of said first additional identification circuit means, the first output of said second additional identification circuit means being connected to the input of the second selector, said additional indicator circuit means having a first input and a second inverting input, said first input being connected to the second output of said second additional identification circuit means and the second inverting input of the additional indicator circuit means being connected to the indicator output of the second additional identification circuit means.

16. A selector comprising selector stages as claimed in claim 10 or 12, said selector including $N(N \geq 2)$ parallel selector stages, the inputs of the identification circuit means of each selector stage being connected in parallel, said selector further including an arbiter circuit having N inputs and N outputs corresponding to said N inputs, the identification circuit means being input to one of said N-inputs and each of the indicator circuit means being connected to one of said N-outputs, said arbiter circuit selecting only a single indicator circuit means to receive the indicator signal output of one identification circuit means when more than one of said parallel connected identification circuit means identifies the same destination address.

* * * * *